Oct. 5, 1943.   K. EMDE   2,330,818
INDICATOR MECHANISM
Filed Sept. 20, 1941   3 Sheets-Sheet 1
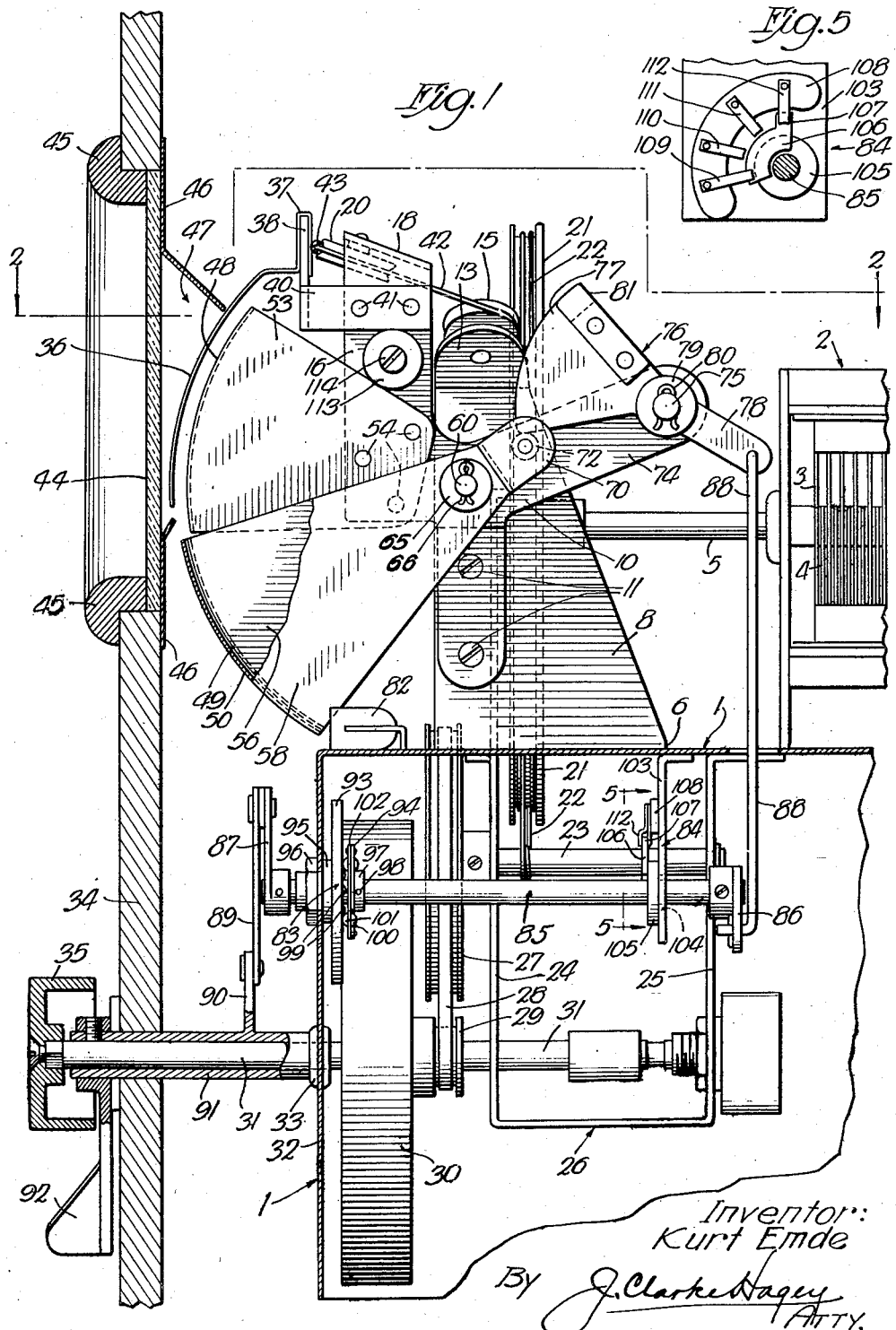
Inventor:
Kurt Emde
By J. Clarke Hagey
Atty.

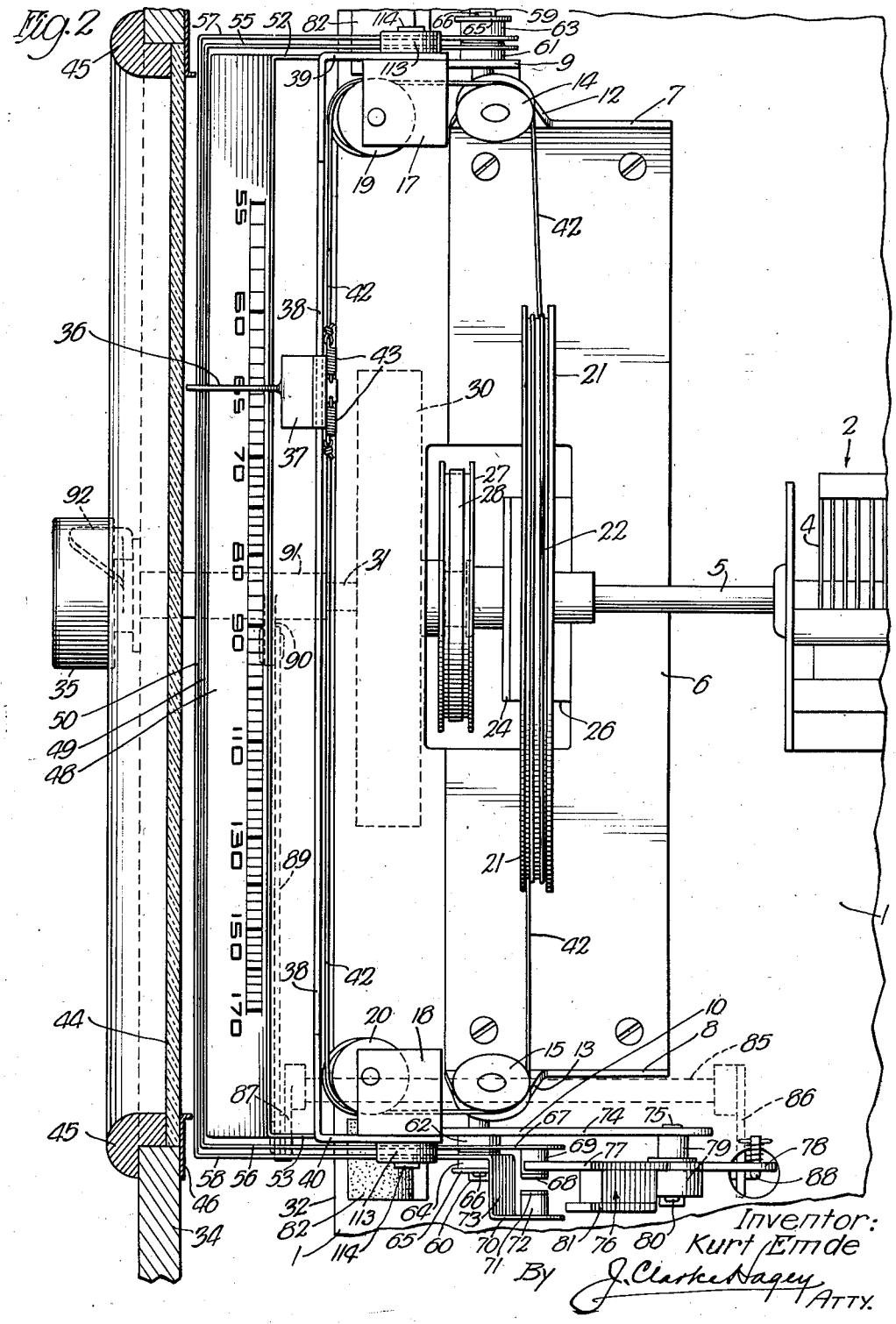

Oct. 5, 1943.                K. EMDE                2,330,818
                        INDICATOR MECHANISM
              Filed Sept. 20, 1941           3 Sheets-Sheet 3
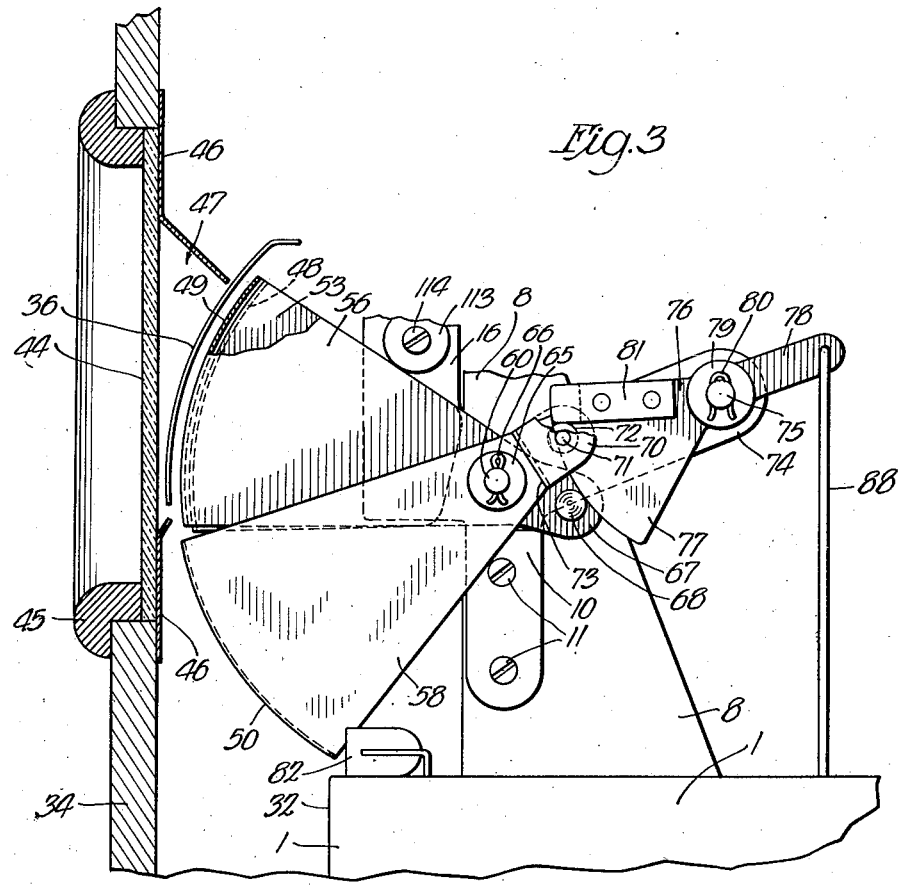
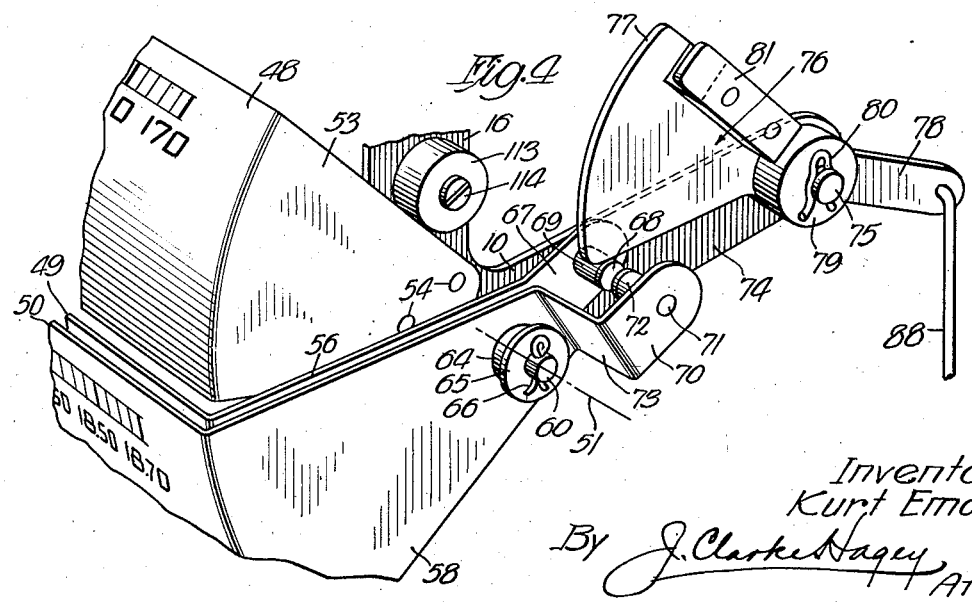
Inventor:
Kurt Emde
By J. Clarke Hagey
        ATTY.

Patented Oct. 5, 1943

2,330,818

UNITED STATES PATENT OFFICE 2,330,818

INDICATOR MECHANISM

Kurt Emde, Itasca, Ill., assignor to Zenith Radio Corporation, Chicago, Ill., a corporation of Illinois Application September 20, 1941, Serial No. 411,760

7 Claims. (Cl. 116—124.1)

This invention relates to indicator mechanism, and more particularly concerns indicator mechanism adapted to selectively display different indicator scales to be used in the adjustment of radio apparatus.

The principal object of the invention is to provide indicator mechanism which is particularly useful in accomplishing what is known as "band spreading," in that it arranges for the use of an indicator scale of suitably extensive area for each of the several frequency bands included within the tuning range of "all wave" radio apparatus, which arrangement provides for maximum band spread and also for more accurate adjustment of the apparatus. Another object of the invention is to provide indicator mechanism employing a plurality of indicator scales in which one only of such scales may be viewed at a time, thus avoiding any possibility of confusion in the employment thereof during adjustment of the apparatus. A further object of the invention is to provide indicator mechanism of the aforesaid character connected with the usual frequency band switch so that the proper indicator scale will be brought into service automatically and coincidently with the adjustment of the radio apparatus for operation within any selected one of several frequency bands. While the invention has been shown and will be described as embodied in tuning indicator mechanism for "all wave" radio receiving sets, it is to be understood that it is not in any sense limited thereto.

In the drawings,

Figure 1 is a vertical fore-and-aft sectional view of indicator mechanism embodying my invention as applied to the tuning devices of radio apparatus;

Fig. 2 is a sectional plan view of the indicator mechanism, taken upon the line 2—2 of Fig. 1;

Fig. 3 is a fragmentary view, illustrating a different adjustment of certain parts of the indicator mechanism shown and viewed as in Fig. 1;

Fig. 4 is a fragmentary perspective detail view, upon a slightly enlarged scale, showing parts of the indicator mechanism of Fig. 3 in the positions illustrated in Fig. 1; and Fig. 5 is a fragmentary sectional view, taken upon the line 5—5 of Fig. 1, illustrating a conventional form of band switch which may be employed.

For various practical reasons, not necessary to mention here, so-called "all wave" radio receiving sets have not been constructed to cover the entire radio frequency spectrum, but only a limited number of selected portions thereof, embracing several of what are termed the short wave, or high frequency, bands as well as the broadcast band of much lower frequencies. Such sets usually employ a plurality of inductance windings, corresponding to the several selected portions of the radio frequency spectrum, and an adjustable band switch for selectively throwing them into and out of circuit connection with a single variable capacitance unit, or tuning condenser. As is well known to those familiar with such apparatus, tuning condensers having sufficient maximum capacity for tuning in the lower frequencies of the broadcast band must be very carefully and accurately adjusted when employed for tuning in the higher frequencies of the short wave bands. Operating mechanism has been provided for effecting this careful and accurate adjustment, one arrangement of which is shown herein as comprising a step-down transmission connecting the manually adjustable tuning knob with the rotor-shaft of the condenser, and a step-up transmission connecting the rotor-shaft of the condenser with the tuning indicator, so that a precise and minute adjustment of the condenser may be effected by manual operation of the tuning knob and such adjustment accurately registered by the tuning indicator in a readily observable manner.

In many of the indicator mechanisms in use upon "all wave" radio receiving sets, the different indicator scales provided for registering the adjustments of the variable capacitance unit are quite limited in extent, and the wide ranges of frequencies covered thereby, particularly by those scales for use with the short wave bands, cannot be indicated thereupon for lack of space, excepting in a general way. As a result, in the short wave bands, where the tuning adjustments require the greater degree of care and accuracy, the closely arranged divisions of the indicator scales represent such wide differences in frequencies as to be of little practical value. Another objectionable feature of the multi-scale indicator mechanisms in general use upon "all wave" radio receiving sets is that, even where scale-identifying indicia is provided, the display of a number of indicator scales requiring the visual selection of the one to be followed for a particular band of frequencies is confusing to the operator.

The present indicator mechanism comprises a plurality of interchangeable, longitudinally extending, indicator scales having different scale arrangements displayed thereupon. I prefer to display but one frequency band upon each of the indicator scales and to spread the scale arrangements so that the divisional markings thereof may be easily observed and followed in the adjustment of the apparatus, but I desire to be not limited to any particular scale arrangement. It will be seen that but one indicator scale is viewable at a time, and that the adjustment of the band switch to condition the apparatus for operation in a selected frequency band will automatically bring the proper indicator scale into view. I thus obtain a much greater band spread and avoid the possibility of any confusion in the use of the different scale arrangements.

Considering, first, the tuner and indicator operating mechanism, and referring to Figures 1 and 2 of the drawings, 1 indicates the chassis of the radio receiving apparatus upon which is fixedly supported a variable tuning condenser 2, having the usual stator-plates 3 and rotor-plates 4, and the adjusting shaft 5 upon which the rotor-plates 4 are secured. Also fixedly supported upon chassis 1 is the framework of the indicator mechanism, comprising the base-plate 6, the end-parts of which are upwardly turned to form vertical brackets 7 and 8, and a pair of bearing-plates 9 and 10 which are respectively secured, as by screws 11, one to each of the brackets 7 and 8. The upper end-parts of brackets 7 and 8 bend outwardly at an oblique angle, as shown at 12 and 13 and support respective pulleys 14 and 15, and bearing-plates 9 and 10 are each formed with an upwardly extending arm, such as 16 (Figure 1), the upper end-parts of which bend inwardly, as at 17 and 18, and support respective pulleys 19 and 20.

A comparatively large pulley 21, the radius of which is considerably greater than that of the rotor-plates 4, is secured upon shaft 5 and is connected by a cord-belt 22 with an intermediate shaft 23, around which the cord-belt may be wound a turn or more to obtain traction. Intermediate shaft 23 is rotatably supported in the vertical sides 24 and 25 of a drop-frame 26 (Figure 1) which is secured to and depends from the top of chassis 1, and a relatively large pulley 27 is secured upon this shaft 23 and connected by a belt 28 with a smaller pulley 29 formed as the hub of a fly-wheel 30 secured upon shaft 31. Shaft 31 is rotatably supported in the side 24 of drop-frame 26 and in the vertical front wall 32 of chassis 1, passing through a bearing 33 therein and extending through the front wall 34 of the casing, and is provided with the usual manual tuning knob 35 fixed upon the outer end thereof. The driving connections just described constitute the step-down transmission to which I have referred as connecting the tuning knob with the rotor-shaft of the condenser.

The tuning indicator comprises a pointer 36 which projects downwardly from a saddle 37 slidably supported upon a horizontal guide-bar 38. Guide-bar 38 extends longitudinally across the framework of the indicator mechanism, slightly forward of the upwardly extending arms 16 of bearing-plates 9 and 10, and is rigidly supported upon said framework by its rearwardly bent ends 39 and 40, which are respectively secured, as by rivets 41 (Figure 1), to the upwardly extending arms 16. As herein shown, the pointer 36 and saddle 37 may be formed as a one-piece unit and the movement thereof along the guide-bar 38 effected by a cord-belt 42, which is passed about pulley 21, over pulleys 14, 15, 19 and 20, and attached to saddle 37 in the manner illustrated in Figure 2. Preferably, the cord-belt 42 is a continuation of cord-belt 22 and the ends thereof are attached to take-up means carried upon saddle 37, such as the pair of springs 43, but separate cord-belts may of course be used and different take-up means employed, if desired. The radius of pulley 21 being considerably greater than that of the rotor-plates 4, this belt connection of saddle 37 with pulley 21 provides a very simple form of step-up transmission to which I have referred as connecting the rotor-shaft of the condenser with the tuning indicator.

Continuing to refer to Figures 1 and 2, and considering, now, the arrangement and construction of the indicator scales and of the mechanism for effecting their selective employment to bring the proper one into service for tuning in the frequency band for which the apparatus may be selectively conditioned, it will be observed that the front wall 34 of the casing is provided with a horizontally extending rectangular opening which I have shown fitted with a transparent window 44, held in position between an outer bezel-moulding 45 and an inner rim-plate 46 having a hooded view-opening 47, and that the pointer 36 projects downwardly into view and is movable from side to side immediately back of said window. Now, when one of the indicator scales is displayed back of said pointer, in the manner I shall describe, the entire scale may be viewed through window 44 and view-opening 47 and the position of the pointer with respect to the divisions of said scale easily observed and followed in the adjustment of the apparatus. A complete turn of the tuning knob 35 will effect but a fractional adjustment of the tuning condenser 2, and such fractional adjustment of the condenser will be represented by a substantial movement of the indicator pointer 36 along the indicator scale, thereby enabling a precise and minute tuning adjustment to be made and accurately indicated.

The present arrangement employs three indicator scales, 48, 49 and 50, of which scale 48 is fixed in position back of pointer 36 and extends horizontally the full length of view-opening 47, scale 49 is pivotally supported to permit it to be swung into and from a position closely in front of scale 48, and scale 50 is pivotally supported to permit it to be swung into and from a position closely in front of scale 49. Preferably, but not necessarily, the three indicator scales are cylindrically curved about a common horizontally extending axis, indicated at 51 (Fig. 4), and the downwardly projecting pointer 36 is curved to parallel the curvatures of the scales, so that the space required between the pointer and scale 48 to permit the movement and inter-positioning of the scales 49 and 50 is minimized. The cylindrical curvature of the scales throughout their length also serves to stiffen them, permit them to be formed of thin material, and prevent warping or distortion thereof, such as might cause them to interfere or rub together during movement of the scales 49 and 50 into and from the positions described, and such as might also interfere with the lateral movement of pointer 36 along the scales.

Obviously, the scales may be of any suitable material and the scale markings may be etched, printed, or otherwise displayed thereon. I prefer to form them of thin sheet metal, pressed to provide the cylindrically curved faces and having the end parts bent rearwardly to form the segment-shaped supporting arms. Scale 48 is fixed in position by securing the arms 52 and 53 thereof to the bearing-plates 9 and 10, respectively, as by flush rivets 54 (Figure 1), and scales 49 and 50 are each pivotally supported by mounting their arms 55, 56, and 57, 58, respectively upon stub-shafts 59 and 60 fixed upon said bearing-plates in positions co-axial with the aforesaid axis 51. Arms 55, 56, 57 and 58 are provided with respective hub-bearings 61, 62, 63 and 64, (Fig. 2), to properly space the arms from each other and from bearing-plates 9 and 10, and these hub-bearings are retained in close arrangement upon stub-shafts 59 and 60 by respective end washers 65 and cotter-pins 66 in a manner to permit free pivotal movement of the scales upon the stub-shafts and prevent lengthwise displacement of the scales with respect to pointer 36.

Referring, now, more particularly to Figures 3 and 4, it will be seen that arm 56 of scale 49 extends rearwardly, as indicated at 67, beyond its pivotal support upon stub-shaft 60 and is provided near its free end with a short laterally extending stud 68 carrying an anti-friction roller 69. Arm 58 of scale 50 also extends rearwardly, as indicated at 70, beyond its pivotal support upon stub-shaft 60 and is provided near its free end with a short laterally extending stud 71 carrying an anti-friction roller 72. As shown clearly in Figures 2 and 4, the rearward extension 70 of arm 58 is given an offset bend 73 and the studs 68 and 71 project toward each other at equal radial distances from the stub-shaft 60.

Bearing-plate 10 is formed with a rearwardly extending arm 74, and a laterally extending stub-shaft 75 is fixed upon the end-part of said arm. Rotatably mounted upon stub-shaft 75 is a rocker 76, which is operatively connected with the band switch and acts in a manner to be described to transmit movement therefrom to the movable indicator scales 49 and 50 and effect their proper selective operation. Rocker 76 comprises a forwardly extending sector-plate 77 having a rearwardly projecting operating arm 78 secured upon a hub 79 which is rotatably mounted upon stub-shaft 75 and retained thereupon by a cotter-pin 80. A plate 81 is secured upon the side of sector-plate 77 in spaced parallel arrangement along the upper radial edge-part thereof. Sector-plate 77 is positioned to engage the anti-friction roller 69 upon the stud 68 of arm 56 of scale 49, and plate 81 is positioned to engage the anti-friction roller 72 upon the stud 71 of arm 58 of scale 50. With the several parts in the positions shown in Figure 4, the operating arm 78 of rocker 76 is lowered and sector-plate 77 is raised, and the two indicator scales 49 and 50 are both allowed to rest against a bumper or stop 82 and expose fixed indicator scale 48.

The manually operable mechanism for selectively conditioning the apparatus for operation in a desired frequency band, and for automatically bringing the proper indicator scale for that band into view, will now be described. Since the present invention may be employed with various selective circuit arrangements and is not limited to any one in particular, no circuit arrangement has been shown. The use of three indicator scales has been described, and a conventional form of three-point band switch will be described for use in connection therewith, it being understood that the radio receiving apparatus in this instance comprises three circuits connected with the band switch for selectively conditioning the apparatus for use in any one of three frequency bands.

In Figure 1, I have shown a three-position detent device 83 and a three-point band switch 84 operatively connected with a shaft 85 which is rotatably supported near its rearward end in member 25 of the drop frame 26 and near its forward end in the front vertical wall 32 of chassis 1. A crank-arm 86 is secured upon the rearward end-part of shaft 85 and a crank-arm 87 is secured upon the forward end-part thereof. The crank-arm 86 is connected by a link 88 with the operating arm 78 of rocker 76 and the crank-arm 87 is connected by a link 89 with a crank-arm 90 secured upon a hollow shaft 91 mounted as a sleeve upon the shaft 31. The forward end of shaft 91 projects through the front wall 34 of the casing and is provided with a manually operable lever 92 secured thereupon.

The detent device 83 comprises a pair of flat circular plates 93 and 94 arranged closely parallel with each other and concentrically about shaft 85. Plate 93 is provided with, or fixed upon, a threaded hub-bushing 95, which constitutes a bearing for shaft 85 and is clamped firmly to vertical wall 32 of chassis 1 by hub-nut 96, whereby plate 93 is held from turning with said shaft. Plate 94 is of spring-material fixed upon a hub 97 which is secured upon said shaft, as by pin 98, and turns therewith. Plate 93 is formed with a series of arcuately arranged projecting knobs or ridges 99, and plate 94 is formed with one or more ball-sockets 100, each having a ball 101 seated therein and held by the ball-retaining plate 102. As shaft 85 is rotated, plate 94 will be rotated thereby with respect to plate 93 and the balls 101 will be rolled over the projecting knobs or ridges 99, the spring-material of plate 94 permitting such rotation and causing a step-by-step adjustment of the shaft as the balls are rolled over said knobs or ridges and down into the valleys therebetween.

The band switch 84 comprises a supporting plate 103 which is secured to and depends from the top of chassis 1. Shaft 85 passes through an opening 104 in said plate, and a collar 105 of insulation-material is fixed upon said shaft close to said opening. An arcuate contact plate 106, having an extending finger 107, is secured upon collar 105. An arcuate plate 108 of insulation-material is fixed upon supporting plate 103, and four spring contact fingers 109, 110, 111 and 112, are secured to plate 108 with their free ends projecting radially inwards toward shaft 85. Contact finger 109 reaches inwardly and contacts plate 106, while contact fingers 110, 111 and 112 do not extend far enough to contact the body of the plate, but are arranged to be contacted by finger 107 thereof in sequence as shaft 85 is rotated. A lead from the tuning circuit of the apparatus may be connected with contact finger 109, and separate leads from the inductance windings corresponding to different frequency or wave bands may be connected with contact fingers 110, 111 and 112. In the present instance, the several contact fingers 110, 111 and 112 represent the separate circuits employed in tuning the apparatus for the respective frequency bands represented by the three indicator scales 50, 49 and 48.

With the manually operable lever 92 in its leftward position, as indicated in dotted lines in Figure 2, shaft 85 will be in the position shown in Figures 1 and 4, in which finger 107 will contact spring contact finger 112 and indicator scale 48 will be exposed to view. Shaft 85 will be retained in this position by the action of detent device 83. For the purpose of this explanation, it may be assumed that this position of the band switch 84 places the apparatus in condition for operation within the broadcast band of frequencies, and that the exposed indicator scale 48 is provided with the proper scale markings for broadcast band tuning.

Counter-clockwise movement of lever 92 from its leftward position to its intermediate position will partially turn shaft 91 and crank-arm 90 and, through link 89 and crank-arm 87, will partially rotate shaft 85 and plate 94 of the detent device 83 to roll the balls 101 over the first of their respective series of knobs or ridges 99 and down into the valleys between the first and second of said knobs or ridges, and the parts will be held in their newly adjusted positions by the action of spring-plate 94 upon the balls 101 in the well-known manner. This one-step adjustment of shaft 85 will shift the contact finger 107 of band switch 84 from its engagement with spring contact finger 112 into engagement with the finger 111 and thereby condition the apparatus for operation in a different frequency or wave band, and will simultaneously partially turn crank-arm 86 and, through link 88 and arm 78, will partially turn rocker 76 to force sector-plate 77 down against roller 69 of stud 68 on the rearward extension 67 of arm 56 of scale 49 and move scale 49 up in front of scale 48, where it will be viewable through window 44 and view-opening 47. Due to the divergence of the paths traversed by sector-plate 77 and arm 67, this movement will cause the lower edge of the sector-plate to move off from and past roller 69, and the forward arcuate edge of the sector-plate will be substituted therefor (see Figure 3), in which position the forward edge of the sector-plate will act upon roller 69 to retain scale 49 in its raised position while permitting further partial turning of rocker 76 in the second step of its adjustment next described. Scale 49 is provided with the proper scale markings for tuning in the frequency or wave band for which the apparatus is now conditioned.

Further counter-clockwise movement of lever 92 from its intermediate position to its rightward position will effect a second step adjustment of shaft 85 in the manner just described; roll the balls 101 of the detent device 83 up and over the second of their respective series of knobs or ridges 99 and down into the valleys between the second and third of said knobs or ridges, where they will be held by the action thereupon of the spring-plate 94; shift the contact finger 107 into engagement with spring contact finger 110, and thereby effect the conditioning of the apparatus for operation in another frequency or wave band; and will simultaneously effect a further partial turn of rocker 76 in the manner previously described. This further turn of rocker 76 will force the plate 81 down against roller 72 of stud 71 on the rearward extension 70 of arm 58 of scale 50 and move scale 50 up in front of scales 48 and 49, where it will be viewable through window 44 and view-opening 47. During this second step partial turn of rocker 76, the forward arcuate edge of sector-plate 77 will move along against the roller 69 on stud 68 to hold the scale 49 in its raised position without increasing the resistance of the second step operation by adding its weight to that of scale 50. It may be assumed that this second step adjustment of the band switch places the apparatus in condition for operation within the short wave band of frequencies, and that the scale 50 is provided with the proper scale markings for short wave band tuning.

The reverse operation of lever 92 and the parts connected therewith is too simple and obvious to need detailed description. It is sufficient to state that clockwise movement of lever 92 from its rightward position to its intermediate position will shift contact finger 107 from spring contact finger 110 into engagement with finger 111, and raise sector-plate 77 and plate 81 sufficiently to permit scale 50 to return to rest against stop 82 and expose scale 49, as shown in Figure 3 of the drawings, and that further clockwise movement of lever 92 from its intermediate to its leftward position will shift contact finger 107 from spring contact finger 111 into engagement with finger 112, and further raise sector-plate 77 to permit scale 49 to return to rest against stop 82 and expose fixed scale 48, as illustrated in the other figures of the drawings.

A bumper 113 is secured by a screw 114 upon each of the upwardly extending arms 16 to extend over the side arms 55, 56, 57 and 58 as a guard against possible overthrow and/or disarrangement of the scales 49 and 50, such as might otherwise be occasioned by rough transportation or handling of the apparatus.

I claim:

1. Indicator mechanism comprising a plurality of longitudinally extending scales, each having scale indicia displayed upon the front face thereof, one of said scales being supported for movement in a cylindric path, and manually operable means operatively associated with said one of said scales acting upon operation to effect its movement into and from a position in front of another of said scales.

2. Indicator mechanism comprising a plurality of longitudinally extending scales, each having scale indicia displayed upon the front face thereof, one of said scales being supported for movement in a cylindric path, an indicator supported for movement lengthwise of said scales to traverse the scale indicia displayed thereupon, and manually operable means operatively associated with said one of said scales acting upon operation to effect its movement into and from a position between said indicator and another of said scales.

3. Indicator mechanism comprising a plurality of longitudinally extending scales, each having scale indicia displayed upon the front face thereof, one of said scales being supported for movement in a cylindric path, a wall arranged in front of said scales having a longitudinally extending opening through which the scale indicia upon said scales may be viewed, and manually operable means operatively associated with said one of said scales acting upon operation to effect its movement into and from a position between the opening in said wall and another of said scales.

4. Indicator mechanism comprising a plurality of longitudinally extending scales, each having scale indicia displayed upon the front face thereof, one of said scales being supported at each end thereof to swing in a cylindric path upon an axis parallel to the face thereof, and manually operable means operatively associated with said one of said scales acting upon operation to effect its swinging movement into and from a position in front of another of said scales.

5. Indicator mechanism comprising a plurality of longitudinally extending scales, each having scale indicia displayed upon the front face thereof, certain of said scales being supported for movement in cylindric paths upon a common axis, and manually operable means operatively associated with said certain of said scales acting upon operation to effect their successive movement into a position in front of another of said scales.

6. Indicator mechanism comprising a plurality of longitudinally extending scales, each having scale indicia displayed upon the front face thereof, certain of said scales being supported for movement in cylindric paths upon a common axis, and manually operable means operatively associated with said certain of said scales acting upon operation to effect their successive movement into and their successive movement from a position in front of another of said scales.

7. Indicator mechanism comprising a plurality of longitudinally extending scales, each having scale indicia displayed upon the front face thereof, one of said scales being supported in fixed position and others of said scales being supported for movement in cylindric paths upon a common axis, and step-by-step manually operable means operatively associated with said others of said scales acting upon one step of its operation to effect the movement of one thereof into a position in front of said fixedly supported scale and retain it in such position, and upon another step of its operation to effect the movement of another one thereof into a position in front of the scale previously moved into and retained in its aforesaid position.

KURT EMDE.